US009056326B2

(12) United States Patent
Schramm et al.

(10) Patent No.: US 9,056,326 B2
(45) Date of Patent: Jun. 16, 2015

(54) DEVICE FOR THERMALLY COATING A SURFACE

(75) Inventors: Leander Schramm, Remda-Teichel OT Teichroeda (DE); Alexander Schwenk, Wohlen (CH); Enrico Hauser, Langenbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/978,856

(22) PCT Filed: Jan. 6, 2012

(86) PCT No.: PCT/EP2012/050192
§ 371 (c)(1),
(2), (4) Date: Sep. 17, 2013

(87) PCT Pub. No.: WO2012/095371
PCT Pub. Date: Jul. 19, 2012

(65) Prior Publication Data

US 2014/0014003 A1 Jan. 16, 2014

(30) Foreign Application Priority Data

Jan. 11, 2011 (DE) ........................ 10 2011 002 501

(51) Int. Cl.

| | |
|---|---|
| ***B23K 10/00*** | (2006.01) |
| ***B05B 7/18*** | (2006.01) |
| ***B05B 7/22*** | (2006.01) |
| ***C23C 4/12*** | (2006.01) |
| ***H05H 1/48*** | (2006.01) |
| *B05B 13/06* | (2006.01) |

(52) U.S. Cl.
CPC . *B05B 7/18* (2013.01); *B05B 7/224* (2013.01); *B05B 13/0636* (2013.01); *C23C 4/125* (2013.01); *C23C 4/127* (2013.01); *H05H 1/48* (2013.01)

(58) Field of Classification Search
CPC .... C23C 4/125; C23C 4/127; B05B 13/0636; B05B 7/22; B05B 7/20; B05B 7/18; H05H 1/34; H05H 1/38; H05H 1/42; H05H 1/48; B23K 9/133; B23K 9/12; B23K 9/122
USPC ............... 219/121.47, 121.48, 121.45, 76.15, 219/76.16, 121.53
See application file for complete search history.

(56) References Cited

U.S. PATENT DOCUMENTS 5,109,150 A * 4/1992 Rogers ..................... 219/121.47
5,245,153 A * 9/1993 Singer et al. ............... 219/76.15
(Continued)

FOREIGN PATENT DOCUMENTS

| | | |
|---|---|---|
| DE | 851708 | 7/1956 |
| WO | 2010112567 | 10/2010 |

OTHER PUBLICATIONS

International Search Report for PCT/EP2012/050192, English translation attached to original, Both completed by the European Patent Office on Apr. 24, 2012, All together 5 Pages.

*Primary Examiner* — Mark Paschall
(74) *Attorney, Agent, or Firm* — Jason Rogers; Brooks Kushman P.C.

(57) ABSTRACT

A device for the thermal coating of a surface, having a wire supply unit for the supply of a wire, wherein the wire acts as a first electrode, a source for plasma gas for generating a plasma gas stream, a nozzle body with a nozzle opening through which the plasma gas stream is conducted as a plasma gas jet to one wire end, and a second electrode which is arranged in the plasma gas stream before the latter enters into the nozzle opening The device is characterized in that the wire supply unit is adjustable, whereby the wire end situated in front of the nozzle opening can be moved by a certain adjustment travel. In this way, it is possible for installation tolerances in the device to be easily compensated, and high and consistent quality of the coating is attained.

17 Claims, 3 Drawing Sheets

(56) References Cited

U.S. PATENT DOCUMENTS

| | | | | | |
|---|---|---|---|---|---|
| 5,707,693 | A * | 1/1998 | Vliet et al. | 427/449 |
| 5,938,944 | A * | 8/1999 | Baughman et al. | 219/76.16 |
| 6,372,298 | B1 * | 4/2002 | Marantz et al. | 427/449 |
| 6,610,959 | B2 * | 8/2003 | Carlson et al. | 219/76.15 |
| 6,706,993 | B1 * | 3/2004 | Chancey et al. | 219/121.47 |
| 8,581,138 | B2 * | 11/2013 | Kowalsky et al. | 219/121.47 |
| 2002/0185473 | A1 | 12/2002 | Carlson et al. | |

* cited by examiner

DEVICE FOR THERMALLY COATING A SURFACE

CROSS-REFERENCE TO RELATED APPLICATIONS

This application is the U.S. national phase of PCT Application No. PCT/EP2012/050192 filed Jan. 6, 2012, which claims priority to German Patent Application No. 10 2011 002 501.4 filed Jan. 11, 2011, which are incorporated herein by reference.

TECHNICAL FIELD

The invention relates to a device for the thermal coating of a surface, a method therefore, and to a component produced by the method.

BACKGROUND

Devices for the thermal coating of a surface are described in U.S. Pat. Nos. 6,372,298 B1, in 6,706,993 B1 and in WO 2010/112567 A1. All of the devices have: a wire supply unit for the supply of a wire, wherein the wire acts as a first electrode; a source for plasma gas for generating a plasma gas stream; a nozzle body with a nozzle opening through which the plasma gas stream is conducted as a plasma gas jet to one wire end; and a second electrode which is arranged in the plasma gas stream before the latter enters into the nozzle opening.

An are forms between the two electrodes through the nozzle opening. Said arc also forms the plasma gas flowing through the nozzle opening. The plasma gas jet emerging from the nozzle opening impinges on the wire end and, there, with the arc, causes the wire to melt and causes the melted wire material to be transported away in the direction of the surface to be coated. Annularly around the nozzle opening there are mounted secondary air nozzles by means of which a swirling secondary gas jet is generated, which secondary gas jet impinges, downstream of the wire end, on the material that has melted off the wire end, and which secondary gas jet thus effects an acceleration of the transport in the direction of the surface to be coated and a secondary atomization of the melted wire material.

The coating should be produced without significant inclusions of non-melted or only partially melted spray particles. Such inclusions or so-called spatter are generally formed by incompletely melted wire material. It has been found that, if the wire is to be melted as completely and uniformly as possible, precise positioning of the wire relative to the nozzle opening is necessary. Likewise, even a very short operating time of the device in the coating mode can necessitate a new alignment of the wire position.

SUMMARY

It is therefore an object of the invention to specify an improved device by means of which a reliable and good coating of the surface, in particular a coating without inclusions and spatter, can be produced in a simple manner.

Said object is achieved by means of the features of claim 1.

By virtue of the fact that the wire supply unit is adjustable, whereby the wire end situated in front of the nozzle opening can be moved by a certain adjustment travel, an alignment of the wire or of the wire end relative to the nozzle opening can be performed in a simple manner. The adjustability or adjustment of the wire is to be understood to mean a very small adjustment travel.

For the alignment, adjustment travels of less than 0.2 mm are generally necessary in order to attain the sufficient precise positioning. The adjustment travel is advantageously no greater than 0.08 mm. Here, the adjustment travel is to be understood to mean the distance travelled by the wire end out of a basic position in front of the nozzle opening to two maximum deflections to the right and left of the basic position during a positioning process. The wire supply unit may self-evidently also move the wire end by greater adjustment travels owing to the type of construction. This is however not necessary for the precise positioning of the wire end, but may be provided if necessary in order to be able to determine the optimum position during the alignment process by virtue of a greater adjustment travel being passed through and then the optimum wire position being determined iteratively.

An adjustment direction of the adjustment travel is preferably at least partially perpendicular to the wire longitudinal axis and/or at least partially perpendicular to the plasma gas jet. Here, the wire supply direction may be configured such that an adjustment movement takes place in any desired direction. Here, at least one component of the adjustment movement is perpendicular to the wire longitudinal axis. A further component of the adjustment movement is perpendicular to the plasma gas jet. In this way, the adjustment of the wire end results in any case in a lateral displacement relative to the plasma gas jet. Here, the nozzle longitudinal axis of the nozzle opening points in approximately the same direction as the plasma gas jet.

The wire supply unit can advantageously be adjusted by static adjustment means. Here, static means that the setting is not changed during one or more coating processes. In general, the adjustment takes place while the device is deactivated. By such adjustment means, it is possible for the wire to be positioned in front of the nozzle opening or in the plasma gas jet in a simple manner. Particularly suitable are adjustment screws by means of which the precise position of the wire can be set in a highly accurate manner.

In a further embodiment, the wire supply unit can be adjusted by dynamic adjustment means. This also permits an adjustment during the operation of the device, that is to say also during a coating process. Here, the adjustment may be quasi-static, that is to say a continuous but small adjustment takes place in order that the wire is always in the correct position.

A dynamic adjustment may however also take place by virtue of the adjustment taking place with a certain frequency. If the device is a rotatable device, such as is used for example for the coating of internal bores, the frequency may be coordinated with the rotational speed of the device in order to compensate for a slight curvature of the wire which is rotating relative to the device. The frequency may however also be higher than the rotational speed.

Alternatively, the frequency is such that a slight vibration of the wire end in the high-frequency range, for example between 1 kHz and 10 kHz, is effected in order to realize reliable melting of the wire end by virtue of the wire end being deflected uniformly within certain positioning limits. In this way, it is ensured that all regions of the wire end are at least temporarily situated in the optimum position with respect to the plasma gas jet. Owing to the high-frequency vibration, individual regions of the wire end depart from said optimum position only so briefly that no hazardous spatter or inclusions can form during the melting. Before these form, the wire end has already swung back, and a region that was previously situated outside is situated in the optimum position again. This significantly improves the melting behavior of the wire end.

Particularly suitable as dynamic adjustment means are piezo crystals which can be switched reliably and quickly, that is to say at high frequency, with little power. To achieve the required adjustment travels, so-called piezo stacks, that is to say multiple stacked piezo crystals, should be used if appropriate.

The wire supply unit advantageously has an adjustable guide piece on which the adjustment means act. An adjustment of the guide piece permits the precise alignment of the wire. Said guide piece is expediently arranged a short distance in front of the point at which the wire emerges from the wire supply unit.

The wire supply unit preferably has an adjustable guide tube and a fixed fastening piece, wherein the guide tube connects the fastening piece and guide piece. The wire supply unit can be fastened in the device by means of the fastening piece, and the wire is guided to the guide piece by means of the guide tube. This ensures relatively long guidance of the wire before said wire emerges from the guide piece. The guide tube, fastening piece and guide piece preferably have a continuous bore through which the wire is guided. The guidance of the wire in the wire supply unit may however also be realized by other suitable means.

In a further embodiment, the fastening piece and guide tube are formed in one piece, and the guide tube is elastically deformed during the adjustment. Owing to the small adjustment travels, the elastic deformation of the guide tube may be sufficient for positioning the wire. Here, the guide piece may be fixedly connected to the guide tube. Alternatively, the guide piece is a separate part and the guide tube then performs only the supply of the wire to the guide piece. The separate guide tube and the guide piece can be centered relative to one another by means of the wire itself.

It is advantageously the case that the fastening piece and guide tube are formed in two pieces, and that an elastic element, in particular an O-ring, is arranged between the fastening piece and guide tube. Whereas the fastening piece is fixedly anchored in the device, the guide tube can be supported via the elastic element. At the same time, the elastic support permits a slight deflection of the guide tube in order to realize the adjustment travel of the wire end. The guide piece may be fixedly connected to the guide tube or formed as a separate part. Here, too, the wire performs the centering of the individual parts relative to one another, at least of the fastening piece and guide tube, and, if the guide piece is also separate, of the guide piece and guide tube.

The guide piece advantageously has lateral guide surfaces for guidance in the device transversely with respect to the adjustment direction. Since the adjustment direction is substantially perpendicular to the plasma gas jet, the positioning in the direction of the plasma gas jet by means of the guide surfaces is sufficient.

If the device is used for carrying out a method for coating, it is possible for the dynamic and/or static adjustment during the starting process of the method to be different than that during the coating process itself. In particular, by means of the dynamic adjustment, it is possible for the wire position or the dynamic adjustment movement to be adapted in an effective manner to the requirements for optimum wire melting. This includes for example that a position of the wire at the start of the method is different than that during the coating, and that a dynamic adjustment movement at the start of the method is different than that during the coating, specifically both with regard to the adjustment travel and also with regard to the frequency of the adjustment movement.

The device is particularly suitable for applying coatings to a cylinder barrel of an internal combustion engine. The small, adjustable wire supply unit can be easily accommodated in a device of restricted dimensions. Such restrictions may apply because a device which is to be inserted into a cylinder bore can have only certain dimensions, normally a diameter of no more than 4 to 5 cm.

BRIEF DESCRIPTION OF THE DRAWINGS

Further details of the invention will emerge from the drawings and from the associated description, in which.

DETAILED DESCRIPTION

Figure 1:
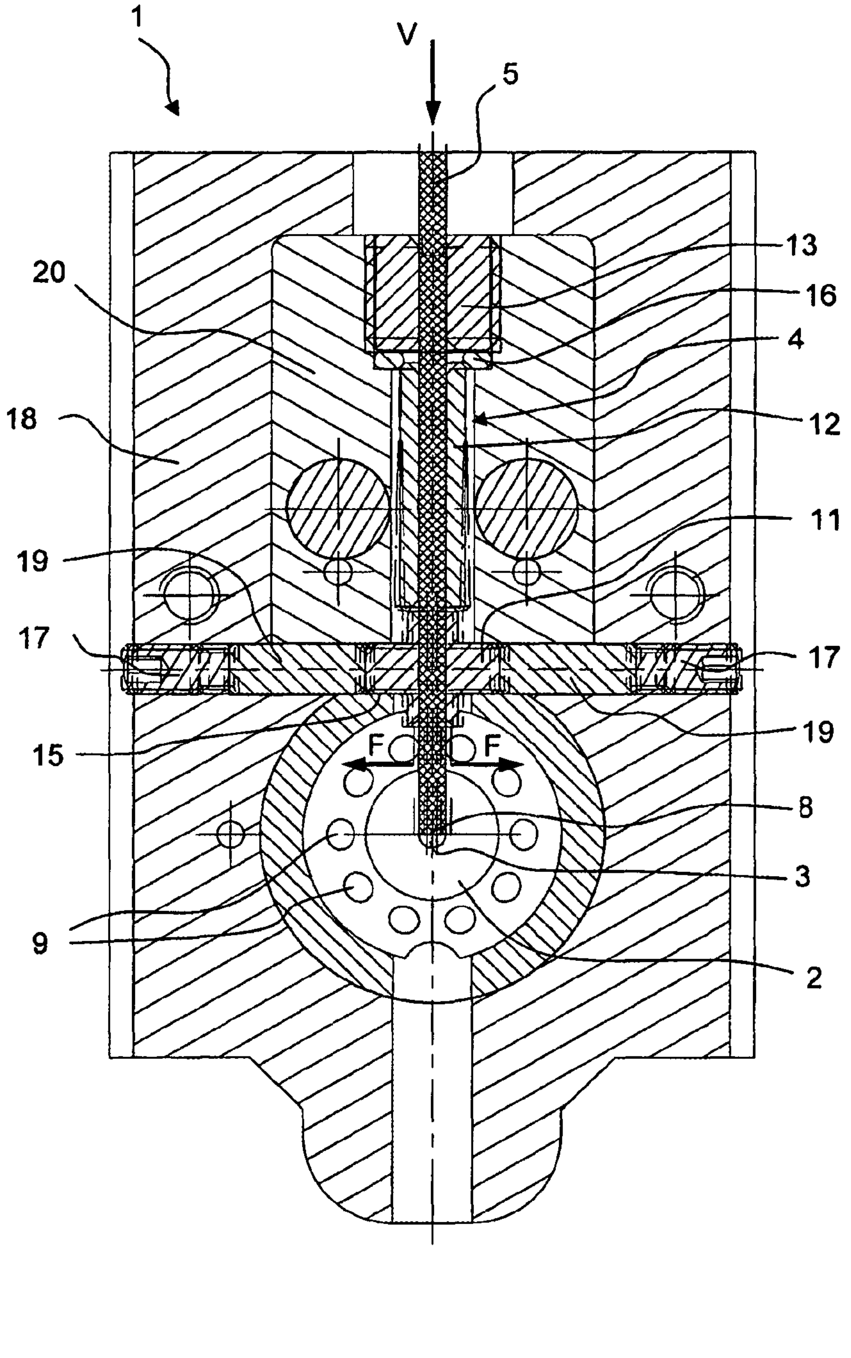
FIG. 1 shows a longitudinal section, along the wire and perpendicular to the nozzle opening, through a device according to the invention.
Figure 2:
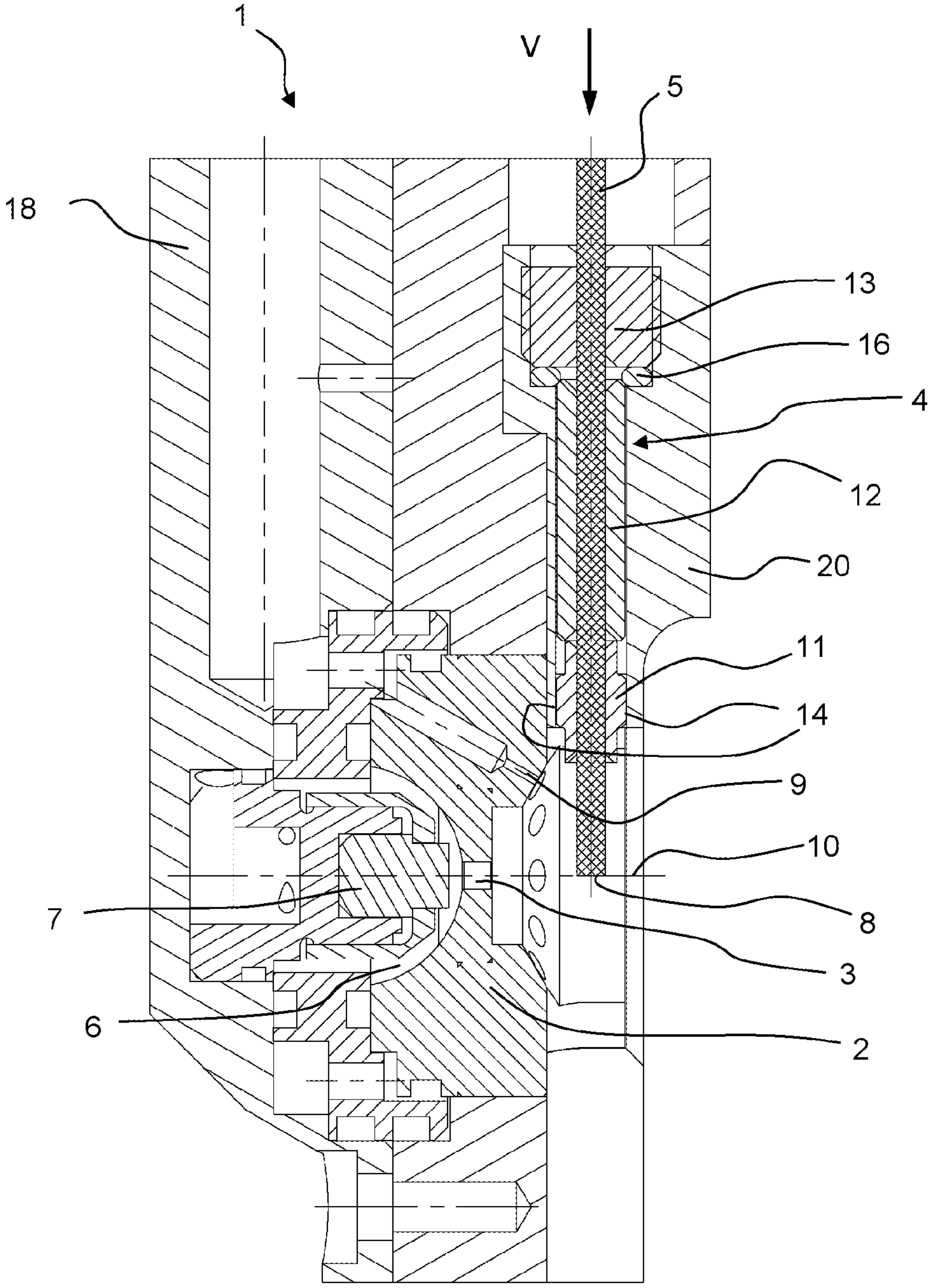
FIG. 2 shows a longitudinal section, along the wire and along the nozzle opening, through the device according to the invention from FIG. 1.

FIGS. 1 and 2 show sections through a device 1 according to the invention. Device 1 has a nozzle body 2 with a nozzle opening 3 and has a wire supply unit 4 for the supply of a wire 5. Here, FIG. 1 shows the longitudinal section along the wire 5 and perpendicular to the nozzle opening 3, and FIG. 2 shows a longitudinal section along the wire 5 and along the nozzle opening 3. The wire 5 is connected to a power source via an electrical contact (not illustrated) arranged above the wire supply unit 4, and thus acts as a first electrode.

Behind the nozzle body 2 there is situated a plasma gas supply 6 which is in the form of a cavity and which is connected to a source (not illustrated) for plasma gas. In the plasma gas supply 6 there is arranged a second electrode 7 which is likewise connected to the power source. When the device is in operation, gas flows out of the plasma gas supply 6 through the nozzle opening 3 to the wire end 8 of the wire 5. If the power source provides a corresponding voltage and current, an arc forms through the nozzle opening 5 between the wire end 8 and the second electrode 7, whereby the gas flowing through the nozzle opening 5 is ionized and thus becomes a plasma gas.

The plasma gas jet emerging from the nozzle opening 3 impinges on the wire end 8 and, there, with the arc, causes the wire 5 to melt and causes the melted wire material to be transported away in the direction of the surface to be coated. During operation, therefore, the wire 5 must be conveyed continuously in the direction of the feed V in order to compensate for the melting of the wire end 8.

Annularly around the nozzle opening 3 there are mounted secondary air nozzles 9 by means of which a swirling secondary gas jet is generated, which secondary gas jet atomizes the melted material at the wire end 8 downstream of the melting region and thus effects an acceleration of the transport in the direction of the surface to be coated and a finer distribution of the melted wire material.

It has surprisingly been found that even a slight alignment error of the wire end perpendicular to the nozzle opening, illustrated by the directional arrows of the two adjustment directions F, leads to an increased occurrence of defects, in particular the inclusion of non-melted or only partially melted spray particles and cavities in the microstructure of the coating. The alignment of the wire 5 therefore takes place substantially perpendicular to the plasma gas jet emerging from the nozzle opening 3, wherein the plasma gas jet is in predominantly the same direction as the nozzle longitudinal axis 10 of the nozzle opening 3. Here, the wire 5 may be displaced, corresponding to the adjustment directions F, to the left or to the right in relation to the nozzle longitudinal axis 10 and the wire longitudinal axis.

Figure 3:
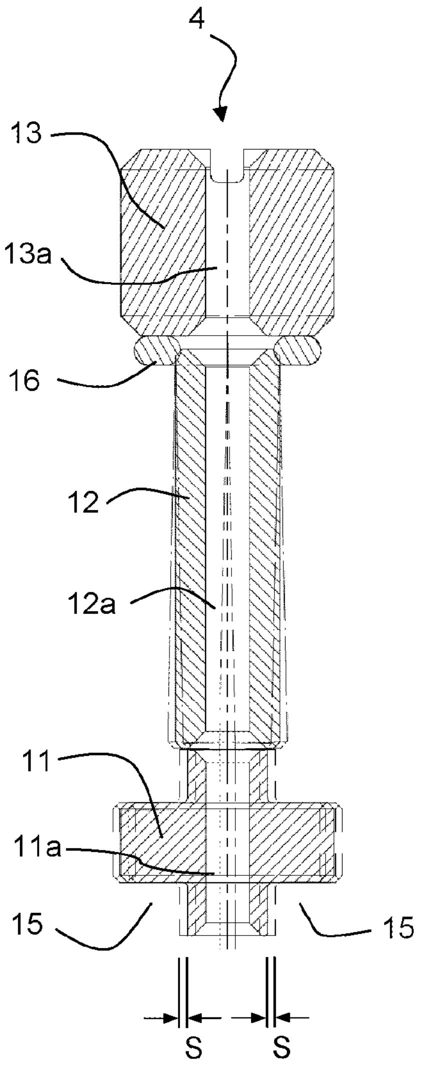
FIG. 3 shows only the wire supply unit from FIG. 1.
Figure 4:
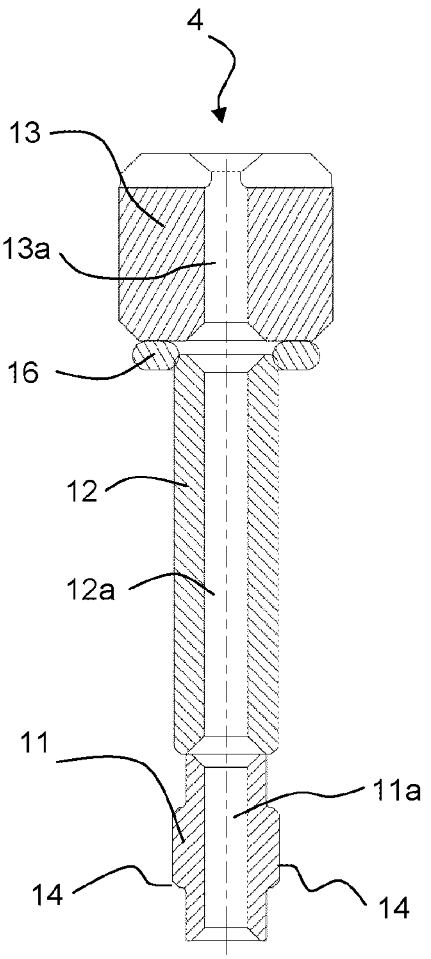
FIG. 4 shows only the wire supply unit from FIG. 2.

FIGS. 3 and 4 illustrate only the wire supply unit 4. Said wire supply unit is composed of an adjustable guide piece 11, an adjustable guide tube 12, and a fastening piece 13 which is fastened in the device 1, wherein the guide tube 12 connects the fastening piece 13 and guide piece 11. The centering of the three parts relative to one another is realized by means of the—not illustrated—wire itself by virtue of the bores 11*a*, 12*a* and 13*a* through which the wire is guided in the guide piece 11, guide tube 12 and fastening piece 13 not exceeding a certain tolerance and thus performing the guidance of the wire 5. Said guidance of the wire 5 in turn centers the three parts relative to one another.

The guide piece 11 has lateral guide surfaces 14 for guidance in the device 1 perpendicular to the adjustment directions F. On the underside, the guide piece 11 has lower support surfaces 15 which effect guidance of the guide piece 11 in the direction of the wire longitudinal axis. In this way, the guide piece can be guided in the device 1 in such a way that a displacement is possible only in the adjustment directions F. The adjustment travel S is shown by the dashed illustration of the guide piece 1 to the left and to the right. At least at its lower end, the guide tube 12 correspondingly moves conjointly, whereas said guide tube is not displaceable in the upper region, at the transition to the fastening piece 13.

Between the fastening piece 13 and guide tube 12 there is arranged an O-ring 16. The fastening piece 13 is fixedly screwed, by means of an external thread, into the device 1 and presses the O-ring 16 against the guide tube 12, which in turn presses the guide piece 11, via the support surfaces 15, against the device 1. In this way, the guide piece 11, guide tube 12 and fastening piece 13 are braced against one another and positively positioned in the device—with the exception of the degree of freedom of the adjustment directions F—wherein the bracing is dependent on the degree of deformation of the O-ring 16. In addition to the imparting of the preload, the O-ring 16 also has the task, during the alignment of the guide piece 11, of permitting, by way of its elastic deformation, a rotation of the guide tube 12 relative to the fastening piece 13.

As shown in FIG. 1, to be able to align the guide piece 11 and thus the wire 5, two grub screws 17 are mounted in the housing 18 of the device 1 to the left and to the right of the guide piece 11. Via two insulation pieces 19, the grub screws 17 transmit the alignment movement to the guide piece 11 and thus also hold the guide piece 11 in the correct position. The adjustment travel S is normally no greater than 0.2 mm, usually even less than 0.08 mm. Therefore, use is made of relatively small grub screws 17 with a fine thread, that is to say small pitch. Grub screws of size M3 with a pitch of 0.5 mm are preferably used.

The wire supply unit 4 is electrically connected to the wire 5 as first electrode. The housing 18 of the device 1 is electrically connected to the second electrode 7. The insulation of the wire supply unit 4 with respect to the housing 18 is realized by virtue of the wire supply unit 4 being fastened in the insulation block 20, wherein the insulation block 20 is produced from a non-conductive plastic. The insulation pieces 19 are necessary in order to ensure that no electrical contact is produced between the housing 18 and wire supply unit 4 by the grub screws 17.

The insulation pieces 19 may also be in the form of piezoelectric actuators. It is thus possible on the one hand for a static voltage and thus a static adjustment to be imparted in order to realize a small degree of play compensation. On the other hand, an alternating voltage may be applied which effects a dynamic adjustment of the position of the wire 5. The dynamic adjustment preferably takes place with a frequency of no lower than 50 Hz. An adjustment frequency of 1 kHz or higher is particularly advantageous. Said frequencies are in any case considerably higher than the rotational speed of the device 1 when the latter is rotating about the fixed wire 5 in order to generate the coating in a bore. The rotational speed of the device 1 normally lies, as a function of the bore diameter to be coated, in a range from 100-700 rpm, that is to say approximately at a frequency of 1-12 Hz. The adjustment frequency is thus considerably higher, and the fixed wire 5 about which the device 1 rotates is, with the necessary adjustment travel, impinged on from all sides by the plasma gas jet.

The dynamic adjustment may also be combined with a static adjustment. Furthermore, it is possible for the dynamic and/or static adjustment during the starting process of the method to be different than that during the coating process itself. It is thus possible for multiple tolerances to be compensated at the start of and/or during the coating.

REFERENCE SIGNS

1 Device
2 Nozzle body
3 Nozzle opening
4 Wire supply unit
5 Wire
6 Plasma gas supply
7 Second electrode
8 Wire end
9 Secondary air nozzles
10 Nozzle longitudinal axis
11 Guide piece
11*a* Bore
12 Guide tube
12*a* Bore
13 Fastening piece
13*a* Bore
14 Guide surfaces
15 Support surfaces
16 O-ring
17 Grub screw
18 Housing
19 Insulation piece
20 Insulation block
F Adjustment direction
S Adjustment travel
V Wire feed

The invention claimed is:

1. A device for the thermal coating of a surface, having:

a housing;

a wire supply unit mounted to the housing for guiding a wire received from a supply of a wire along a wire axis, the wire supply unit having a co-axial fixed wire guide, and an adjustable guide, wherein the free end of the wire extends beyond the adjustable guide an acts as a first electrode, a nozzle body having a plasma gas supply inlet for generating a plasma gas stream and a nozzle opening through which the plasma gas stream is conducted as a plasma gas jet aimed at and spaced from the first electrode, and a second electrode attached to the housing arranged on a longitudinal axis aligned with the plasma gas stream as it flows through the nozzle opening toward the first electrode, wherein the adjustable guide has a single degree of freedom, whereby the first electrode can be adjusted along an transverse axis generally perpendicular to both the wire axis and the longitudinal axis while maintaining a fixed spacing between the nozzle opening and the first electrode.

2. The device as claimed in claim 1, further comprising a guide tube oriented co-axially between the fixed and the adjustable guides.

3. The device as claimed in claim 1, wherein the adjustable guide can be adjusted by adjustment screws.

4. The device as claimed in claim 1, wherein the adjustable guide can be adjusted by dynamic actuators.

5. The device as claimed in claim 4, wherein the dynamic actuators comprise piezo actuators.

6. The device as claimed in claim 2, wherein the wire supply unit further comprises an elastic element interposed axially between the fixed guide and the guide tube axially biasing the guide tube toward the adjustable guide.

7. The device as claimed in claim 1, wherein the adjustable guide has flat lateral guide side and bottom surfaces for guidance along the transverse axis.

8. A device for the thermal coating of a surface, comprising:

a wire supply unit for the supply of a wire, wherein an end of the wire acts as a first electrode;

a nozzle body having a plasma gas supply inlet for plasma gas for generating a plasma gas stream, and a nozzle opening through which the plasma gas stream is conducted, as a plasma gas jet, to the first electrode; and a second electrode which is arranged in the plasma gas stream before the plasma gas stream enters into the nozzle opening, wherein the wire supply unit is adjustable by means of adjustment screws, whereby the wire end situated in front of the nozzle opening can be moved by a certain adjustment travel;

wherein the wire supply unit has an adjustable guide on which the adjustment screws act, an adjustable guide tube and a fixed fastening, wherein the guide tube connects the fastening piece and adjustable guide piece, and an elastic element between the guide tube and the fixed fastening piece which is elastically deformed during the adjustment.

9. The device as claimed in claim 8, wherein the elastic element, comprises an O-ring.

10. The device as claimed in claim 8, wherein the wire supply unit further comprises adjustment screws for positioning the adjustable guide.

11. The device as claimed in claim 8, wherein the wire supply unit further comprises piezo actuators for positioning the adjustable guide.

12. The device as claimed in claim 10, wherein the wire supply unit can be further adjusted by dynamic piezo actuators.

13. The device as claimed in claim 8, wherein the adjustable guide has flat lateral guide side and bottom surfaces for guidance in the adjustment direction.

14. A method for the thermal coating of a surface by means of a device as claimed claim 1, comprising;

supplying a plasma gas to the plasma gas supply inlet;

feeding wire to the wire supply unit;

supplying electric power to the first and second electrode to create an arc to form a plasma jet directed at the first electrode to melt the electrode end creating a molten metal spray; and adjusting the adjustable guide transversely relative to the plasma jet without changing the longitudinal spacing of the first electrode and the nozzle in order to minimize spatter caused by incompletely wire melting.

15. The method as claimed in claim 14, wherein the adjustment travel of the adjustable guide is no greater than 0.2 mm.

16. The method as claimed in claim 14, wherein the adjusting step is performed dynamically while the coating is being generated with a frequency of no lower than 50 Hz.

17. The method as claimed in claim 14, wherein an adjustment made during a starting process of the method which is different than the adjustment during the coating process itself.

* * * * *